US007512157B2

(12) United States Patent
Anderton et al.

(10) Patent No.: US 7,512,157 B2
(45) Date of Patent: Mar. 31, 2009

(54) SYNCHRONIZING A MODEM AND VOCODER OF A MOBILE STATION

(75) Inventors: David O. Anderton, Austin, TX (US); Jeffrey L. Yiin, Austin, TX (US)

(73) Assignee: ST Wireless SA, Geneva (CH)

( * ) Notice: Subject to any disclaimer, the term of this patent is extended or adjusted under 35 U.S.C. 154(b) by 543 days.

(21) Appl. No.: 11/153,065

(22) Filed: Jun. 15, 2005

(65) Prior Publication Data

US 2006/0285557 A1   Dec. 21, 2006

(51) Int. Cl.
*H04J 3/06* (2006.01)
(52) U.S. Cl. ........................................ 370/503
(58) Field of Classification Search .............. 370/503, 370/480, 464, 310, 498
See application file for complete search history.

(56) References Cited

U.S. PATENT DOCUMENTS

| 5,426,643 | A | * | 6/1995 | Smolinske et al. | 370/506 |
| 5,586,119 | A | | 12/1996 | Scribano et al. | 370/350 |
| 5,781,593 | A | * | 7/1998 | Petch et al. | 375/354 |
| 6,064,693 | A | * | 5/2000 | Oliver et al. | 375/222 |
| 6,421,353 | B1 | * | 7/2002 | Kim | 370/465 |
| 6,658,027 | B1 | | 12/2003 | Kramer et al. | 370/516 |
| 6,754,265 | B1 | * | 6/2004 | Lindemann | 375/240 |
| 7,286,522 | B2 | * | 10/2007 | Preston et al. | 370/352 |
| 2003/0002609 | A1 | * | 1/2003 | Faller et al. | 375/372 |

FOREIGN PATENT DOCUMENTS

WO    WO 00/24144    4/2000

OTHER PUBLICATIONS

Dent, Peter. "GSM Adaptive Multi-Rate Voice Coding on the TMS320C62x™ DSP". Application Report SPRA625—Feb. 2000.
U.S. Appl. No. 11/152,136, filed Jun. 14, 2005, entitled "Performing Diagnostics In A Wireless System" by David O. Anderton.
U.S. Appl. No. 11/253,469, filed Sep. 23, 2005, entitled "Synchronizing A Channel Codec And Vocoder Of A Mobile Station," by Shaojie Chen and Guner Arslan.
PCT/US2006/011770 International Search Report with Written Opinion of the International Searching Authority Mailed Oct. 4, 2006.

* cited by examiner

*Primary Examiner*—Anh-Vu H Ly
(74) *Attorney, Agent, or Firm*—Lisa K. Jorgenson; William J. Kubida; Hogan & Hartson LLP

(57) ABSTRACT

In one embodiment, the present invention includes a method for determining a level of a buffer that stores data samples. The level may be determined at a predetermined position of a data frame sequence. Based on the level of the buffer at this position, a vocoder and modem of a mobile station may be synchronized. One or both of the vocoder and modem may be adjusted to attain the synchronization. Thus a rate mismatch between the vocoder and modem may be resolved.

21 Claims, 3 Drawing Sheets

SYNCHRONIZING A MODEM AND VOCODER OF A MOBILE STATION

FIELD OF THE INVENTION

The present invention relates to data processing and more particularly to speech processing in a wireless device.

BACKGROUND

Wireless devices or mobile stations (MS) such as cellular handsets transmit and receive speech waveforms. Baseband signal processing internal to such a handset is generally divided into two principal components, a vocoder and a modem. The function of the vocoder is to perform source encoding and decoding on speech waveforms. Source coding removes redundancy from the waveform and reduces the bandwidth (or equivalently the bit-rate) in order to transmit the waveform in real-time. The modem typically includes a channel encoder/decoder and a channel modulator/demodulator. The function of the channel coder is to increase redundancy in the transmitted signal to enhance the robustness of the transmitted signal. The channel modulator/demodulator converts the data stream into a format suitable for transmission in a bandlimited radio frequency (RF) channel.

A number of different wireless protocols exist. One common protocol is referred to as global system for mobile communications (GSM). In a GSM system, the vocoder operates on blocks of speech data that are 20 milliseconds (ms) in duration. The modem transmits and receives data every 4.615 ms. Since the speech encoder (i.e., vocoder) serves as a data source to the channel encoder/modulator (i.e., modem) and the speech decoder (i.e., vocoder) serves as the data sink for the channel demodulator/decoder (i.e., modem), the vocoder and modem should be maintained in synchronization.

Further, the speech encoder should deliver data to the channel encoder with sufficient margin to complete channel encoding and modulation operations before the time at which the data are transmitted over the air. Further complicating the issue are limits on the round-trip delay of the overall communications link. Hence, the vocoder cannot deliver the data too early lest the delay budget (such as that set forth by the European Telecommunications Standards Institute (ETSI)) be violated, and cannot deliver data too late lest the data be discarded. As a practical matter, the later the vocoder delivers data to the channel encoder, the harder a digital signal processor (DSP) must work to complete all signal processing on schedule, thus creating a greater system load.

A suitable analogy to the synchronization problem is the delivery of fruit via a train. Consider the case of freshly picked apples. If they are brought to the train station too early, they may spoil before the train arrives. In contrast, if the apples are brought to the train station too late, the train may depart prior to delivery of the apples to the station. Thus the delivery of the apples should be maintained in synchronization with the schedule of the train, just as the vocoder and modem should be maintained in synchronization.

If the modem and vocoder fall out of synchronization, the effects can be severe, including but not limited to: the DSP peak load may exceed 100%, resulting in the failure of other DSP-based functions (or even system crashes); speech buffers may wrap-around before data can be processed for transmission, distorting speech with a 'metallic-like' quality; or the ETSI-defined delay budget may be exceeded.

The synchronization problem is further complicated by handset mobility, which can result in a Doppler shift of received frequencies. If the handset is in a car or other conveyance with a component of motion radial to the serving cell, then the received frequency from the base station will be shifted up or down. The handset compensates for this Doppler shift by adjusting its internal crystal to null the perceived offset. From the modem's perspective, system timing will be too high or too slow and without correction, the handset will transmit a little earlier or later on each successive data frame. However, the modem compensates for the temporal offset by tracking the center point of each received burst from the base station and manually forces temporal alignment to match the location of the received bursts. In this manner, the modem can stay on schedule even in the presence of significant Doppler shifts.

The vocoder, on the other hand, has no inherent mechanism for pacing its operation to compensate for errors in the crystal frequency. Hence, the vocoder will operate on a speech stream to and from the modem that is running slightly too fast or too slow. Over time, errors accumulate, and eventually the modem and vocoder will drop out of synchronization.

Accordingly, methods and apparatus to maintain synchronization between modem and vocoder would improve performance of a mobile station.

SUMMARY OF THE INVENTION

In one embodiment, the present invention includes a method for determining a level of a buffer that stores data samples and synchronizing a vocoder and a modem of a mobile station based on the level of the buffer. For example, the level of the buffer may indicate a mismatch in the rate at which the vocoder and modem are operating. By analysis of the buffer level, these components may be adjusted to move towards synchronization.

Other embodiments may be implemented in an apparatus, such as an IC. The IC may include a buffer to store a speech block, a vocoder coupled to the buffer to encode the speech block, and a modem coupled to the vocoder to modulate the encoded speech block. In various embodiments, at least the vocoder is controlled to maintain the modem and the vocoder in substantial synchronization. As an example, the IC may take the form of a digital signal processor.

Embodiments of the present invention may be implemented in appropriate hardware, firmware, and software. To that end, a method may be implemented in hardware, software and/or firmware to synchronize a vocoder and modem. The method may perform various functions including comparing an actual level of a buffer at a selected time within a data structure to a predetermined level, analyzing whether a differential exists between the actual level and the predetermined level, and determining whether to adjust a vocoder coupled to the buffer based on the differential.

In one embodiment, the system may be a wireless device such as a cellular telephone handset, personal digital assistant (PDA) or other mobile device. Such a system may include a transceiver, as well as digital circuitry. The digital circuitry may include circuitry such as an IC that includes at least some of the above-described hardware, as well as control logic to implement the above-described methods.

DETAILED DESCRIPTION

Figure 1:
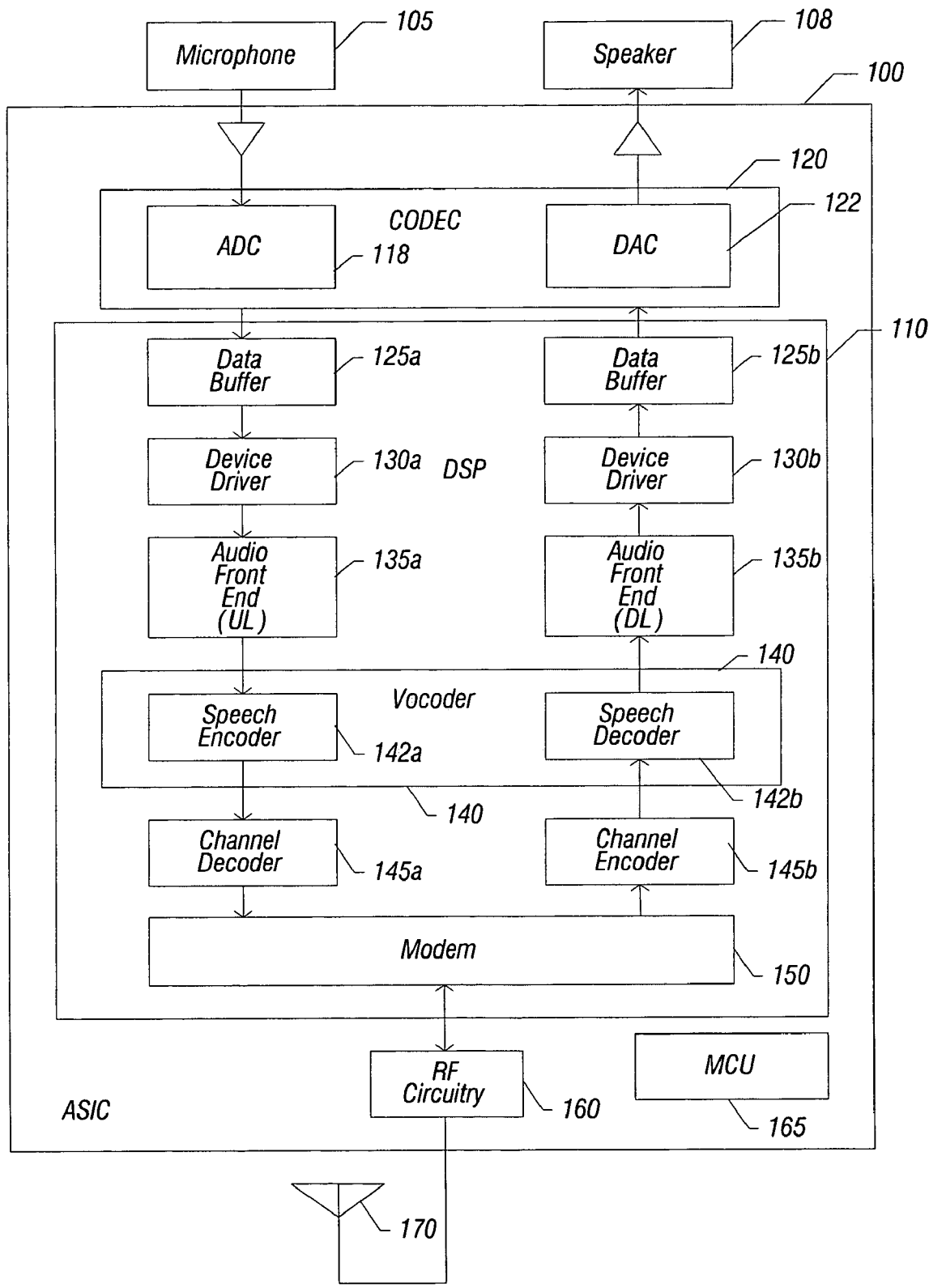
FIG. 1 is a block diagram of a signal processing transmission chain for audio data in a wireless device in accordance with an embodiment of the present invention.

Referring to FIG. 1, shown is a block diagram of a transmission chain used for signal processing of audio data in a wireless device in accordance with an embodiment of the present invention. The transmission chain may take the form of multiple components within a cellular handset or other mobile station, for example. As shown in FIG. 1, an application specific integrated circuit (ASIC) 100 may include both baseband and radio frequency (RF) circuitry. The baseband circuitry may include a digital signal processor (DSP) 110. DSP 110 may process incoming and outgoing audio samples in accordance with various algorithms for filtering, coding, and the like.

While shown as including a number of particular components in the embodiment of FIG. 1, it is to be understood that DSP 110 may include additional components and similarly, some portions of DSP 110 shown in FIG. 1 may instead be accommodated outside of DSP 110. It is also to be understood that DSP 110 may be implemented as one or more processing units to perform the various functions shown in FIG. 1 under software control. That is, the functionality of the different components shown within DSP 110 may be performed by common hardware of the DSP according to one or more software routines. As further shown in FIG. 1, ASIC 100 may include a microcontroller unit (MCU) 165. MCU 165 may be adapted to execute control applications and handle other functions of ASIC 100.

DSP 110 may be adapted to perform various signal processing functions on audio data. In an uplink direction, DSP 110 may receive incoming voice information, for example, from a microphone 105 of the handset and process the voice information for an uplink transmission from the handset. This incoming audio data may be converted from an analog signal into a digital format using a codec 120 formed of an analog-to-digital converter (ADC) 118 and a digital-to-analog converter (DAC) 122. In some embodiments, the analog voice information may be sampled at 8,000 samples per second (kS/s). The digitized sampled data may be stored in a temporary storage medium, such as a buffer 125. In some embodiments, one or more such buffers may be present in each of an uplink and downlink direction. While shown in FIG. 1 as being part of DSP 110, it is to be understood that the buffers may be located within another portion of ASIC 100 or even external to the chip, so long as they are accessible by DSP 110. While the type of storage may vary in different embodiments, in some embodiments buffer 125 may be a first-in-first-out (FIFO) buffer or a circular buffer. In addition to storage, buffer 125 may include various control registers, including one or more pointers to indicate the current storage location to be next accessed. For example, each buffer may include a write pointer to point to the next storage location to be written to and a read pointer to point to the next storage location to be read from.

The audio samples may be collected and stored in buffer 125 until a complete data frame is stored. While the size of such a data frame may vary, in embodiments used in a time division multiple access (TDMA) system, a data frame (also referred to as a "speech frame") may correspond to 20 ms of real-time speech (e.g., corresponding to 160 speech samples). In various embodiments, the input buffer may hold 20 ms or more of speech data from ADC 118. In one particular embodiment, a buffer to store at least 30 ms may be used, although the scope of the present invention is not so limited. As will be described further below, an output buffer 125b may hold 20 ms or more of speech data to be conveyed to DAC 122, and in a particular embodiment a buffer to store at least 30 ms may be used.

The buffered data samples may be provided to a device driver 130a for processing. In some embodiments, the storage buffers may be located within the device driver. From device driver 130a, the data is provided to a front-end processor 135a for further processing, such as equalization, volume control, fading, echo suppression, echo cancellation, noise suppression, automatic gain control (AGC), and the like. From front-end processor 135a data is provided to a vocoder 140 for encoding and compression. As shown in FIG. 1, vocoder 140 may include a speech encoder 142a in the uplink direction and a speech decoder 142b in a downlink direction. Vocoder 140 then passes the data via a channel decoder 145a to a modem 150 for modulation. The modulated data is then provided to RF circuitry 160, which may be a transceiver including both receive and transmit functions to take the modulated baseband signals from modem 150 and convert them to a desired RF frequency (and vice versa). From there, the RF signals including the modulated data are transmitted from the handset via an antenna 170.

In a downlink direction, incoming RF signals may be received by antenna 170 and provided to RF circuitry 160 for conversion to baseband signals. The transmission chain then occurs in reverse such that the modulated baseband signals are coupled through modem 150, a channel encoder 145b, vocoder 140, front-end processor 135b, device driver 130b, buffer 125b, and DAC 122 to obtain analog audio data that is coupled to, for example, a speaker 108 of the handset.

During the course of speech processing within DSP 100, vocoder 140 and modem 150 may fall out of synchronization. As previously discussed, such loss of synchronization can lead to undesired performance reductions. Accordingly, embodiments of the present invention may be used to maintain the vocoder and modem in substantial synchronization. As used herein, the term "substantial" synchronization means that vocoder and modem may be synchronized to a level at which adverse performance effects are avoided. In some embodiments, such synchronization may correspond to a number of audio samples, for example, less than 5 samples. As an example, the loss of synchronization may occur as a result of movement of a handset with regard to a base station, causing a Doppler shift in received frequencies, which in turn causes a change in internal oscillation frequency of the handset. This in turn causes the modem to change its rate of operation, leading to a loss of synchronization.

In various embodiments, an analysis of the level of buffers used for incoming and outgoing speech data (i.e. an input buffer and an output buffer) at a known point in time relative to the TDMA frame structure or modem schedule may be used to determine timing between vocoder and modem. Furthermore, by analyzing changes in the buffer level between different data sequences, embodiments may adjust timing to maintain synchronization between vocoder and modem.

Although synchronization may be characterized by a variety of models, a representative model may determine when a speech block of a given size is filled (in the uplink direction) or emptied (in the downlink direction) with respect to the timing of an entire data frame structure. For purposes of discussion, a GSM system implementing a TDMA scheme will be used. However, it is to be understood that other protocols may implement the synchronization methods and apparatus disclosed herein.

The fundamental repeatable unit in a GSM traffic channel is a sequence of 26 TMDA frames. This frame structure is replicated over and over again for the duration of a phone call.

Each TDMA frame is 4.615 ms in duration, and thus a frame sequence of 26 TDMA frames consumes 120 ms of real-time. In various embodiments, this frame sequence may be processed in multiple blocks. For example, speech blocks or frames of 20 ms each may be processed. Thus a frame sequence may represent the transmission and reception of six distinct speech frames (each 20 ms in duration). Specifying when any one of these speech frames or blocks fills with respect to the full-frame structure may define modem-vocoder timing in the uplink direction. Similarly, specifying when any one of these speech frames empties on the downlink side is sufficient to specify modem-vocoder timing in the downlink direction.

Consider the case of an uplink (i.e., input) buffer. Acoustic energy is converted into an electrical signal by a microphone and the resulting analog signal is sampled (e.g., at 8 kS/s) and converted into digital format via an ADC. Samples are collected and stored in the uplink buffer accessible to a DSP until such time that a complete data frame (e.g., 20 ms or 160 samples) is resident. The complete speech frame is then encoded by a speech encoder (i.e., vocoder) and the compressed speech frame is passed to a channel encoder/modulator (i.e., modem). Since all speech data are collected and transmitted, it is sufficient to specify a single point in time at which the input buffer fills (e.g., has 160 samples) within the full-frame sequence (e.g., 120 ms). Given one such reference point, the complete buffer schedule can be determined since the buffer will fill every 20 ms thereafter. The reference point may be at a fixed point in time relative to the frame structure. In one embodiment a TDMA frame interrupt that occurs at the leading edge of each 26-frame sequence may be used as the reference point. However, any number of other points such as the rising edge of the receive burst, the falling edge of the receive burst, the rising edge of the monitor burst, or the falling edge of the monitor burst on any TDMA frame may be used. Similarly, any system interrupt with a fixed time relationship (before or after) the leading edge of any TDMA frame (coincident with the energy in the receive burst impinging on the antenna) may be used.

Two parameters may be used to control placement of the uplink and downlink audio block schedule. These parameters may thus control the absolute system delay. For the uplink side, the time differential between the time when the input buffer is filled (i.e., the buffer has accumulated 20 ms of new acoustic data) and the frame interrupt coincident with the first frame (T2=0) of a full-frame structure may be used. For the downlink side, the time differential between the time when the output buffer is empty (i.e., the downlink buffer has at least 20 ms of free space-sufficient to accommodate a new speech block) and the frame interrupt generated coincident with the first frame (T2=0) of a full-frame structure may be used.

Equations may be used to relate the two parameters above to the initial values of a pointer that points to the buffers. That is, initial values for a write pointer (for an uplink buffer) and a read pointer (for a downlink output buffer) may be determined such that the input buffer will fill and the output buffer will empty according to the parameters. Similarly the fill level of a FIFO may be set to achieve the specified system delay.

Let delta, $\Delta$, denote the time in milliseconds from the time the input buffer fills until the beginning (i.e., rising edge of the receive burst) of the first TDMA frame in a full-frame sequence. With respect to a frame counter (i.e., T2) that counts from 0 to 25 and delineates the frames in a traffic channel, the beginning point occurs at T2=0. Note that specifying $\Delta$ may completely determine the buffer fill schedule, and with an understanding of buffering in the codec and filter delays in the ADC/DAC circuitry in the acoustic signal path, one can choose $\Delta$ to satisfy a desired timing constraint, such as the ETSI delay budget. In one embodiment, the delay parameter $\Delta$ may be 12 ms, although the scope of the present invention is not so limited. Given $\Delta$, one can determine how full the input buffer should be at the beginning of any TDMA frame or any other point in time with a fixed reference to the TDMA frame timing. In a mobile station, the beginning of a TDMA frame is coincident with the rising edge of the first receive burst in the frame. This is a convenient reference point, but any other reference with a fixed relationship to the TDMA frame timing could be employed. On a given frame within a full-frame sequence, the expected number of samples (N) in the input buffer is given by the equation:

$$N=[(\Delta+T_2 \cdot 4.6150) \cdot 8] \% 160 \tag{Eq. 1}$$

where % denotes the modulo operation. For $\Delta=12$ ms and $T_2=0$, N=96. That is, the input buffer may be artificially filled (e.g., by zero padding) with 96 samples to achieve the delay value of 12 ms.

Modem-vocoder synchronization may be achieved by fixing the depth of the input buffer artificially at start-up to conform to the expected fill level as expressed in Eq. (1). In some embodiments, the buffer may be zero-padded to fill in pre-loaded signal samples to the desired depth. Similarly, the fill depth of the input buffer may be checked using Eq. (1) on any TDMA frame boundary (or any other predetermined reference point) to verify that the modem and vocoder are in synchronization.

A similar analysis applies to the downlink path. However, for the downlink side, the output buffer empty condition—that is, when the output buffer has at least 160 empty slots (sufficient space to accommodate one new speech frame) may be the status to be analyzed. In some embodiments, the reference point may be defined as the last output buffer-empty condition prior to the beginning of a full TDMA frame (e.g., T2=0). Eq. (1) may be used for the downlink portion, but it is used to determine the number of empty slots in the buffer (i.e., N) instead of the number of signal samples. On initialization, the buffer pointer may be set such that the output buffer contains 160—N samples. These samples can be preloaded with zeros, since no more data will become available until a complete speech frame is decoded. In some embodiments, a value of $\Delta=6$ ms may be a reasonable choice for determining N in the downlink direction, although the scope of the present invention is not so limited.

The position of the read/write pointers (if circular buffers are used) relative to their expected values may be evaluated to determine if the vocoder is advancing or retarding relative to the modem schedule. This analysis may be invoked on a predetermined interval. For example, the analysis may be performed on every frame interrupt or less often. In one embodiment, the analysis may be performed once per multi-frame sequence.

In addition to determining the position of the pointers and thus the buffer levels, this information may be used to synchronize the vocoder and modem. That is, based on the buffer level, the vocoder may be adjusted to maintain synchronization with the modem. In various embodiments, the vocoder is not adjusted based on every measurement. Instead, a series of measurements may be analyzed to determine whether and how to adjust the vocoder. Specifically, logic to provide hysteresis and smoothing on these instantaneous measurements may be provided. Due to interrupt latency, among other reasons, the vocoder schedule is not adjusted based on a single measurement. Instead, the differential (i.e., between actual and expected pointer values) may exceed a target level, such as two acoustic samples, to avoid over-reacting to innocuous timing deltas. The logic may keep modem and vocoder in synchronization by single-sample (i.e., add or drop) adjustments, in some embodiments.

For every full-frame sequence, the "slippage" (S) between the modem and vocoder, expressed in terms of number of samples, may be calculated as $N_e - N_a$ where $N_e$ is the expected number of datum and $N_a$ is the actual number of datum in the buffer. If the absolute value of the slippage is larger than a threshold (denoted by TH), the system may force synchronization directly, rather than waiting for one or more additional full-frame sequences to perform synchronization. This direct or immediate synchronization may correspond to an emergency alignment, in which the modem and vocoder are forced into synchronization by adjusting the fill level of the buffers. In the case where S is positive, zeros are added to the buffer to increase the fill level. If S is negative, then data are discarded from the buffer to decrease the fill level. However, this option may produce audible artifacts (for S positive or S negative) in the voice path and hence may be only used if modem and vocoder are seriously out of step.

If instead, the slippage is less than the threshold (TH), but larger than a lower level, M, the system may do one of the following: (1) if M<|S|<TH, for at least K consecutive times (e.g., over K multi-frames), the system adjusts the vocoder such that the slippage is decremented or incremented by one sample (depending on whether the vocoder is deemed too fast or too slow with respect to the modem); (2) if M<|S|<TH for less than K consecutive times, the system will not make any adjustment. TH, M and K may all be tunable parameters, in some embodiments. In one particular embodiment, the values may correspond to TH=20, M=2, and K=3, although other values are possible and within the scope of the present invention. Of course, other manners of determining whether to adjust the vocoder if a differential exists may be implemented.

Different manners of adjusting the vocoder via a single-sample adjustment may be made. In some embodiments, a mechanism for interpolating speech blocks to add or drop one acoustic sample may be implemented.

Referring now to Table 1, shown is an implementation of adjusting the vocoder for data samples flowing in an uplink direction. If the codec clock is running too fast relative to the modem, then S<0, and the timing is to be retarded—that is, the rate at which data samples are read from the input buffer is reduced. Similarly, if the codec clock is running too slow relative to the modem, then S>0, and the timing is to be advanced, that is, the rate at which data samples are read from the input buffer is increased. In all cases, one complete speech block (160 samples) is delivered to the speech encoder.

TABLE 1

| | |
|---|---|
| Retard Timing | Read 159 samples from the ADC and perform |
| S < 0 | block interpolation to create 160 samples. |
| Advance Timing | Read 161 samples from the ADC and perform |
| S > 0 | block decimation to create 160 samples. |

Referring now to Table 2, shown is a protocol for adjusting the vocoder for data samples flowing in a downlink direction. The speech decoder delivers one complete speech frame (160 samples). Hence, the speech block is interpolated to increase or decrease the number of signal samples to retard or advance timing.

TABLE 2

| | |
|---|---|
| Retard Timing | Interpolate a block of 160 samples to create 161 |
| S < 0 | samples and route to the DAC. |
| Advance Timing | Decimate a block of 160 samples to create 159 |
| S > 0 | samples and route to the DAC. |

Given a block of L signal samples, $\{x[k], k=0, 1, 2, \ldots, L-1\}$, interpolation of the block from L to L+1 signal samples can be achieved in one embodiment with the recursion:

$$y[k] = k \cdot \delta \cdot x[k-1] + (1 - k \cdot \delta) x[k], 0 \leq k \leq L \quad \text{(Eq. 2)}$$

where $$\delta = \frac{1}{L} \quad \text{(Eq. 3)}$$

and $x[-1] = x[L] = 0$.

Similarly, given a block of L+1 signal samples, $\{x[k], k=0, 1, 2, \ldots, L\}$, interpolation of the block from L+1 to L signal samples can be achieved with the recursion:

$$y[k] = (1 - k \cdot \delta) \cdot x[k] + k \cdot \delta \cdot x[k+1], 0 \leq k < L \quad \text{(Eq. 4)}$$

where $$\delta = \frac{1}{L-1} \quad \text{(Eq. 5)}$$

A variety of interpolation/decimation routines can be used. In other embodiments, other methods of sample adjustments such as zeroth order linear interpolation (i.e., repeating one sample to expand a block and deleting one sample to contract a block), may be implemented. In one embodiment, a linear interpolation scheme that operates over the entire block may be used to minimize discontinuities. In such manner, the effect of adding or dropping a sample is perceptually undetectable to a human observer.

Figure 2:
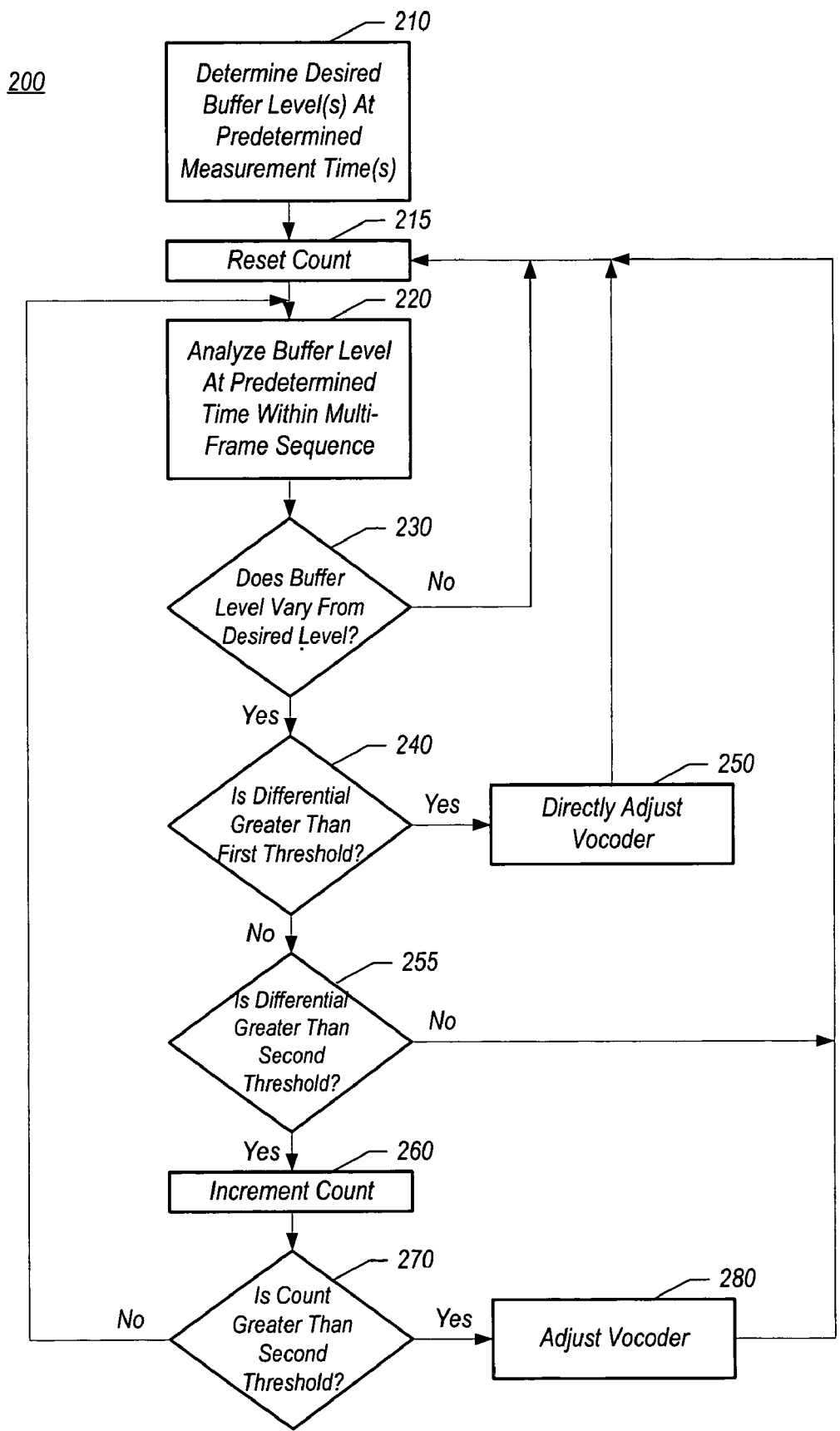
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to synchronize a modem and vocoder. First, a desired buffer level may be determined at a predetermined measurement time (block 210). For example, the desired buffer level, N, may be calculated in accordance with Eq. 1 above. In various embodiments, the desired buffer level may be determined by a manufacturer with respect to a particular system based on system delays, buffer size, and the like. Also, initially a count indicative of the number of full-frame sequences in which the buffer level has varied from the desired level may be reset (block 215).

Next, during normal operation the buffer level may be analyzed at a predetermined time within a multi-frame sequence (block 220). With respect to a GSM system, the buffer level at the beginning of a full 26-frame sequence may be analyzed. The buffer level may be determined using Eq. 1. Then it may be determined whether the buffer level varies from the desired level (diamond 230). If not, the modem and vocoder are in synchronization. Accordingly, the count indicative of the number of full-frame sequences in which the buffer level has varied from the desired level may be reset (block 215). Upon resetting this count, control returns to block 220 for a similar analysis during the next data structure.

If instead at diamond 230 it is determined that a differential exists between the actual buffer level and the desired buffer level, next it may be determined whether the differential is greater than a first threshold (diamond 240). In various embodiments, the first threshold may correspond to a relatively high differential, meaning that the modem and vocoder are significantly out of synchronization. This first threshold may correspond to the threshold TH, discussed above. Accordingly, if the differential is greater than the first threshold, control passes to block 250 in which the vocoder is directly adjusted (block 250). As discussed above, this direct or immediate synchronization may be an emergency mode in which a number of samples are added or deleted. Thereafter, control may return to block 215, where the count (of consecutive frame sequences) is reset. Then control returns to block 220 for analysis of the next data structure.

If instead at diamond 240 the differential is not greater than the first threshold, control passes to diamond 255, where it may be determined whether the differential is greater than a second threshold (diamond 255). The second threshold may correspond to a minimum difference between a modem and vocoder, for example, corresponding to the lower level M described above. If the differential is less than the threshold, control returns to block 215, where the count is reset and control returns to block 220 for analysis of a next data structure.

If instead at diamond 255 it is determined that the differential is greater than the second threshold, control passes to block 260. There, the count corresponding to the number of consecutive data structures that show a differential is incremented (block 260). Next it may be determined whether that count is greater than a third threshold (diamond 270). The third threshold may correspond to a number of consecutive times (i.e., data structures) for which a differential may exist before any adjustment is to occur. The third threshold may correspond to a count K of consecutive multi-frame sequences, discussed above. If the count is greater than the third threshold, the vocoder may be adjusted (block 280). For example, a single sample may be added or deleted. The adjustment may take the form of those shown in Table 1 and Table 2, for example. Then the count is reset (block 215) and control returns to block 220 for analysis of a next data structure. If instead at diamond 270 the count is not greater than the third threshold, no action is taken, and control returns to block 220 for analysis of the next data structure (i.e., multi-frame sequence).

Accordingly, in various embodiments a mechanism for basic modem-vocoder synchronization may be provided. Further, continual monitoring and correction to maintain synchronization may be implemented to maintain synchronization, generally without any detectable effect on voice data. The methods described herein may be implemented in software, firmware, and/or hardware. A software implementation may include an article in the form of a machine-readable storage medium onto which there are stored instructions and data that form a software program to perform such methods. As an example, the DSP may include instructions or may be programmed with instructions stored in a storage medium to perform vocoder-modem synchronization in accordance with an embodiment of the present invention. Furthermore, the software may be tunable. For example, a manufacturer may tune the parameters described above for a particular system after design and field test occurs. Still further, the software may be modified after fabrication via patching. In such manner, modem-vocoder synchronization may be effected while consuming modest system resources.

Figure 3:
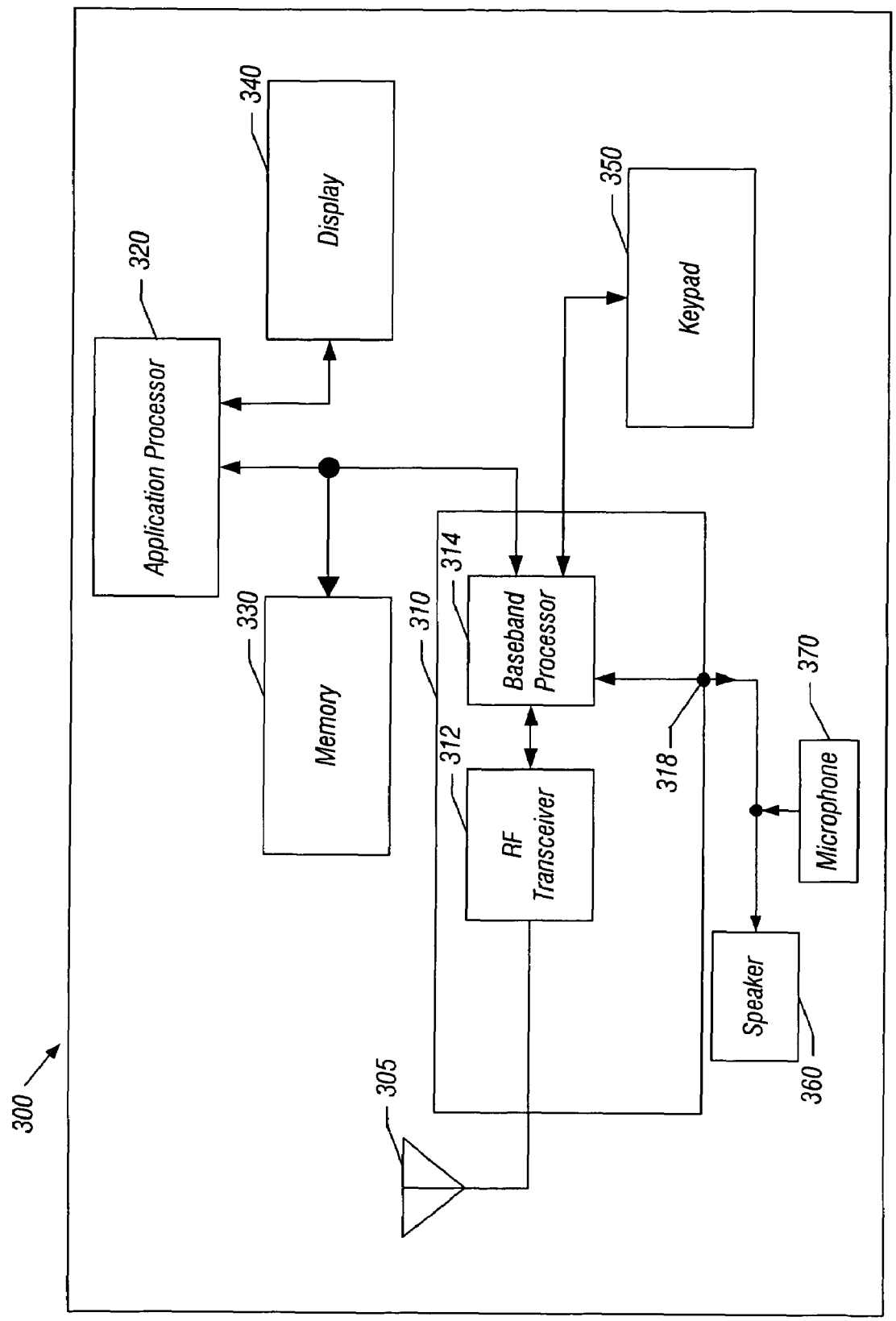
FIG. 3 is a block diagram of a system in accordance with one embodiment of the present invention.

Referring now to FIG. 3, shown is a block diagram of a system in accordance with one embodiment of the present invention. As shown in FIG. 3, system 300 may be a wireless device, such as a cellular telephone, PDA, portable computer or the like. An antenna 305 is present to receive and transmit RF signals. Antenna 305 may receive different bands of incoming RF signals using an antenna switch. For example, a quad-band receiver may be adapted to receive GSM communications, enhanced GSM (EGSM), digital cellular system (DCS) and personal communication system (PCS) signals, although the scope of the present invention is not so limited. In other embodiments, antenna 305 may be adapted for use in a general packet radio service (GPRS) device, a satellite tuner, or a wireless local area network (WLAN) device, for example.

Incoming RF signals are provided to a transceiver 310 which may be a single chip transceiver including both RF components and baseband components. Transceiver 310 may be formed using a complementary metal-oxide-semiconductor (CMOS) process, in some embodiments. As shown in FIG. 3, transceiver 310 includes an RF transceiver 312 and a baseband processor 314. RF transceiver 312 may include receive and transmit portions and may be adapted to provide frequency conversion between the RF spectrum and a baseband. Baseband signals are then provided to a baseband processor 314 for further processing.

In some embodiments, transceiver 310 may correspond to ASIC 100 of FIG. 1. Baseband processor 314, which may correspond to DSP 110 of FIG. 1, may be coupled through a port 318, which in turn may be coupled to an internal speaker 360 to provide voice data to an end user. Port 318 also may be coupled to an internal microphone 370 to receive voice data from the end user.

After processing signals received from RF transceiver 312, baseband processor 314 may provide such signals to various locations within system 300 including, for example, an application processor 320 and a memory 330. Application processor 320 may be a microprocessor, such as a central processing unit (CPU) to control operation of system 300 and further handle processing of application programs, such as personal information management (PIM) programs, email programs, downloaded games, and the like. Memory 330 may include different memory components, such as a flash memory and a read only memory (ROM), although the scope of the present invention is not so limited. Additionally, a display 340 is shown coupled to application processor 320 to provide display of information associated with telephone calls and application programs, for example. Furthermore, a keypad 350 may be present in system 300 to receive user input.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for use with a mobile station having a vocoder and a modem, comprising:
   determining a data level of a first buffer responsive to the modem reaching a predetermined position of a data frame sequence; and
   synchronizing the vocoder and the modem based on the determined data level of the first buffer.

2. The method of claim 1, further comprising pre-filling the first buffer with pre-loaded signal samples corresponding to a preselected depth of the first buffer.

3. The method of claim 2, further comprising:
comparing the data level of the first buffer to the preselected depth; and
measuring a differential between the data level of the first buffer and the preselected depth, wherein the vocoder and the modem are synchronized responsive to the differential.

4. The method of claim 3, further comprising comparing the differential to a threshold value.

5. The method of claim 4, wherein synchronizing the vocoder and the modem comprises adjusting a timing of the vocoder if the differential is greater than the threshold value.

6. The method of claim 1, further comprising adjusting a timing of the vocoder to synchronize the vocoder and the modem, wherein the modem is operating at an adjusted rate corresponding to an adjusted oscillator frequency of the mobile station based on movement of the mobile station with respect to a base station with which the mobile station is communicating.

7. The method of claim 1, wherein synchronizing the vocoder and the modem comprises interpolating a block of data samples in the vocoder by adding or dropping one data sample from the block.

8. An apparatus comprising:
a first buffer to store a speech block;
a vocoder coupled to the buffer to encode the speech block; and
a modem coupled to the vocoder to modulate the encoded speech block, wherein at least the vocoder is controlled to maintain the modem and the vocoder in substantial synchronization based on a level of the first buffer, the level determined responsive to the modem reaching a predetermined position of a data frame sequence.

9. The apparatus of claim 8, wherein the apparatus comprises a digital signal processor including the modem and the vocoder.

10. The apparatus of claim 9, wherein at least one of the modem and the vocoder comprises a software routine executed on the digital signal processor.

11. The apparatus of claim 8, further comprising logic to determine the level of the first buffer and to compare the level of the first buffer to a predetermined buffer level.

12. The apparatus of claim 11, wherein the logic is to increment a count if the level of the first buffer is different than the predetermined buffer level.

13. The apparatus of claim 12, wherein the logic is to adjust the vocoder if the count is greater than a threshold count.

14. The apparatus of claim 13, wherein the adjustment comprises an interpolation of the speech block.

15. A mobile station comprising:
an input device to receive voice information from a user and convert the voice information to an analog signal;
an analog-to-digital converter (ADC) coupled to the input device, the ADC to convert the analog signal into digitized speech data;
a first buffer coupled to ADC to store the digitized speech data;
a digital signal processor (DSP) coupled to the first buffer, the DSP to encode the digitized speech data into encoded digitized speech data, to modulate the encoded digitized speech data into modulated encoded digitized speech data and to synchronize the encoding and the modulation based on a level of the first buffer, the level of the first buffer determined responsive to the modulation reaching a predetermined position of a data sequence;
radio frequency (RF) circuitry coupled to the DSP; and
an antenna coupled to the RF circuitry.

16. The mobile station of claim 15, wherein the first buffer is integrated within the DSP.

17. The mobile station of claim 15, wherein the DSP and the RF circuitry are at least in part integrated within the same integrated circuit.

18. The mobile station of claim 15, wherein the DSP is to:
determine if a differential exists between the level of the first buffer at the predetermined position in the data sequence to a predetermined level for the first buffer; and
adjust a timing of the encoding if the differential is greater than a first threshold.

19. The mobile station of claim 18, wherein the DSP is to immediately adjust the timing of the encoding via adding or dropping a plurality of samples of the digitized speech data.

20. The mobile station of claim 18, wherein the DSP is to:
increment a count of data sequences if the differential is less than the first threshold but greater than a second threshold
compare the count to a third threshold; and
adjust the timing of the encoding if the differential is greater than the third threshold.

21. The mobile station of claim 20, wherein the DSP is to adjust the timing of the encoding via linear interpolation of a block of the digitized speech data.

* * * * *